Nov. 20, 1923.
H. J. RICHARDS
SPOON HOLDER
Filed Dec. 26, 1922
1,474,733
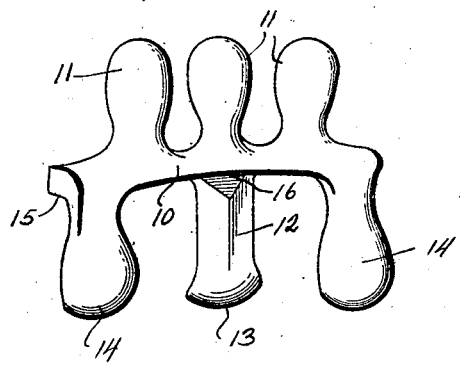
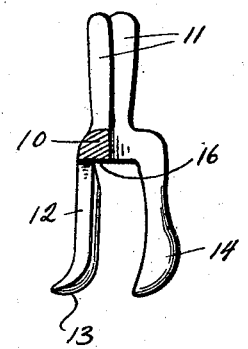
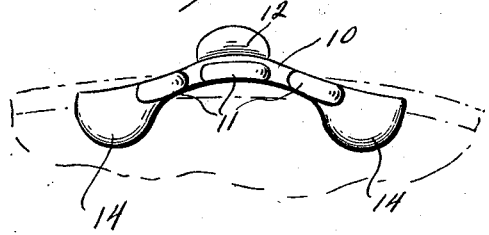
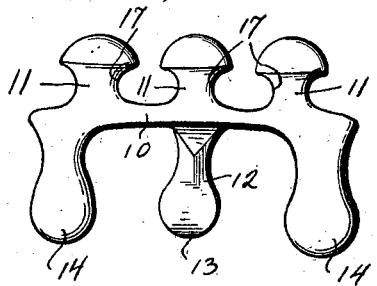
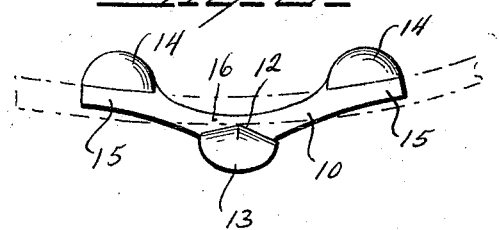
Inventor
H. J. Richards
By Watson E. Coleman
Attorney Patented Nov. 20, 1923.

1,474,733

UNITED STATES PATENT OFFICE.

HENRY J. RICHARDS, OF COLUMBUS, OHIO.

SPOON HOLDER.

Application filed December 26, 1922. Serial No. 608,928.

*To all whom it may concern:*

Be it known that I, HENRY J. RICHARDS, a citizen of the United States, residing at Columbus, in the county of Franklin and State of Ohio, have invented certain new and useful Improvements in Spoon Holders, of which the following is a specification, reference being had to the accompanying drawings.

This invention relates to devices for holding spoons in connection with bowls, pots, pans, or any other cooking or table utensils, and the general object of the invention is to provide a very simple, attractive and effective spoon holder of this character which may be easily put in place on the side wall of a bowl, pail or pan or which may be as readily detached therefrom, and which will support one or more spoons within the utensil.

Another object is to provide a device of this character which will fit sufficiently firmly upon the wall of the utensil to hold it in place, while at the same time it will be adapted to fit a large number of utensils having different diameters or different thicknesses of walls.

Other objects will appear in the course of the following description.

My invention is illustrated in the accompanying drawings, wherein:—

Figure 1 is an elevation of one embodiment of spoon holder constructed in accordance with my invention;

Figure 2 is a top plan view of the construction shown in Figure 1;

Figure 3 is a bottom plan view of the construction shown in Figure 1;

Figure 4 is a sectional view thereof;

Figure 5 is an elevation of a modified form of my device.

Referring to these drawings, it will be seen that I have illustrated two forms of my device, both of which have exactly the same principle, but one of which is adapted for kitchen utensils and the other for tableware.

In Figure 1, it will be seen that my device comprises a longitudinally extending body 10 having two, three or more upwardly extending fingers 11. The body 10 is somewhat curved, as shown in plan view in Figure 2, and the fingers therefore are also disposed on a curved line. These fingers are shown as uniformly spaced apart and each finger 11 has a more or less flat outer surface and a longitudinally and transversely rounded inner surface. These fingers 11 are, of course, integrally formed or cast with the body 10.

At the middle of the body 10 there is a wall clasping finger 12 which is off-set somewhat from the corresponding finger 11 and whose inner surface is slightly rounded. The lower end of this finger is deflected outward at 13. The extremities of the body 10 are formed with two depending fingers 14 which, with the finger 12, are adapted to clasp or embrace the wall of the disk or other utensil. The inner faces of these fingers 14 are slightly downwardly and inwardly curved, while the outer faces thereof are convexly rounded and are relatively thickened.

It will be seen that a shoulder 15 is formed at the junction of the fingers 14 with the bar or body 10, while a corresponding shoulder 16 is formed at the junction of the finger 12 with the end edge face of the bar or body. The device is preferably cast in one piece and is preferably made of polished aluminum or like material so as to form an attractive article.

In Figure 5, I illustrate a construction which to all intents and purposes is the same as the construction illustrated in Figure 1 but which is smaller and is adapted more particularly for table use. The construction is precisely the same in this form as in the other form heretofore described except that the fingers 11 are more undercut at 17 so as to interlock with the shanks of dessert spoons or other spoons which may be used on the table and make it slightly more difficult to detach the spoon from the bowl or other utensil. These fingers 11 in Figure 5 are less in height than the equivalent fingers in the construction shown in Figure 1 but they operate in precisely the same way.

It is obvious that minor modifications might be made in the form and construction of this holder without departing from the spirit of the invention.

I claim:—

A spoon holder of the character described comprising a longitudinally extending, slightly curved body having at its middle and ends downwardly depending fingers, the end fingers being off-set for the whole length from the plane of the middle finger whereby the end fingers may be disposed on the inside face of a curved wall and the middle finger disposed on the outside face thereof, the middle finger being downwardly and outwardly curved and being transversely rounded on its inner face, the end fingers being transversely rounded on their outer faces and the end fingers being downwardly and inwardly curved, the body forming shoulders at the upper ends of the depending fingers, and spoon engaging fingers extending upward from the body of the holder and spaced from each other, the body and the upwardly and outwardly extending fingers being cast in one piece.

In testimony whereof I hereunto affix my signature.

HENRY J. RICHARDS.